US010523568B2

(12) United States Patent
Cherukuri et al.

(10) Patent No.: US 10,523,568 B2
(45) Date of Patent: Dec. 31, 2019

(54) ADAPTIVE LOAD BALANCING FOR APPLICATION CHAINS

(71) Applicant: Cisco Technology, Inc., San Jose, CA (US)

(72) Inventors: Sunil Cherukuri, Cary, NC (US); Xiao Hu Gao, Chapel Hill, NC (US); Alexander B. Altman, Chapel Hill, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 251 days.

(21) Appl. No.: 15/374,504

(22) Filed: Dec. 9, 2016

(65) Prior Publication Data
US 2018/0167450 A1   Jun. 14, 2018

(51) Int. Cl.
*H04L 12/801* (2013.01)
*H04L 29/08* (2006.01)
*H04L 29/06* (2006.01)
*H04L 12/851* (2013.01)
*H04L 12/803* (2013.01)
*G06F 9/50* (2006.01)

(52) U.S. Cl.
CPC ............ *H04L 47/18* (2013.01); *H04L 47/125* (2013.01); *H04L 47/24* (2013.01); *H04L 67/1004* (2013.01); *H04L 67/1023* (2013.01); *H04L 67/1031* (2013.01); *H04L 67/1036* (2013.01); *H04L 67/42* (2013.01); *G06F 9/5083* (2013.01)

(58) Field of Classification Search
CPC . H04L 47/18; H04L 67/1031; H04L 67/1023; H04L 67/1036; H04L 47/125; H04L 67/1004
See application file for complete search history.

(56) References Cited

U.S. PATENT DOCUMENTS

| | | | |
|---|---|---|---|
| 6,950,848 B1 * | 9/2005 | Yousefi'zadeh | H04L 67/101 707/999.01 |
| 7,672,236 B1 * | 3/2010 | Karunakaran | H04L 67/1002 370/230.1 |
| 9,497,136 B1 * | 11/2016 | Ramarao | H04L 47/70 |
| 9,854,002 B1 * | 12/2017 | Streete | H04L 63/10 |
| 10,063,482 B2 * | 8/2018 | Kwak | H04L 47/125 |

(Continued)

*Primary Examiner* — Ramy M Osman
(74) *Attorney, Agent, or Firm* — Polsinelli PC

(57) ABSTRACT

Disclosed are systems, methods, and computer-readable storage media for adaptive load balancing for application chains. A load-balancer can receive a data packet for a connection/transaction to be routed through an application chain. The load-balancer can select, based on an application path table, a first end-to-end application path through the application chain. The application path table can identify two or more end-to-end application paths through the application chain along with a corresponding performance status for each end-to-end application path through the application chain. The performance status for an application path can indicate a performance level of the end-to-end application path determined based on performance of previous data packets for previous connections transmitted through the application chain according to the end-to-end application path. The load-balancer can then route the data packet through the application chain according to the first end-to-end application path and across multiple tiers.

19 Claims, 9 Drawing Sheets

(56) References Cited

U.S. PATENT DOCUMENTS

| | | | |
|---|---|---|---|
| 10,237,187 B2* | 3/2019 | Paramasivam | H04L 67/02 |
| 2009/0303882 A1* | 12/2009 | Tanaka | H04L 47/10 |
| | | | 370/237 |
| 2011/0282982 A1* | 11/2011 | Jain | G06F 9/5094 |
| | | | 709/223 |
| 2012/0173709 A1* | 7/2012 | Li | G06F 9/5011 |
| | | | 709/224 |
| 2015/0244583 A1* | 8/2015 | Wan | H04L 41/145 |
| | | | 709/223 |
| 2016/0094384 A1* | 3/2016 | Jain | H04L 67/10 |
| | | | 709/221 |
| 2016/0127256 A1* | 5/2016 | Sharma | G06F 17/30914 |
| | | | 709/226 |
| 2016/0277542 A1* | 9/2016 | Bhatia | H04L 67/1023 |
| 2016/0294681 A1* | 10/2016 | Khakpour | H04L 45/306 |
| 2017/0048148 A1* | 2/2017 | Huang | H04L 67/1002 |
| 2017/0155706 A1* | 6/2017 | Hiltunen | H04L 43/0882 |
| 2017/0317932 A1* | 11/2017 | Paramasivam | H04L 47/125 |
| 2017/0353387 A1* | 12/2017 | Kwak | H04L 47/125 |
| 2018/0054389 A1* | 2/2018 | Ao | H04L 47/125 |
| 2018/0167450 A1* | 6/2018 | Cherukuri | H04L 67/1004 |

* cited by examiner

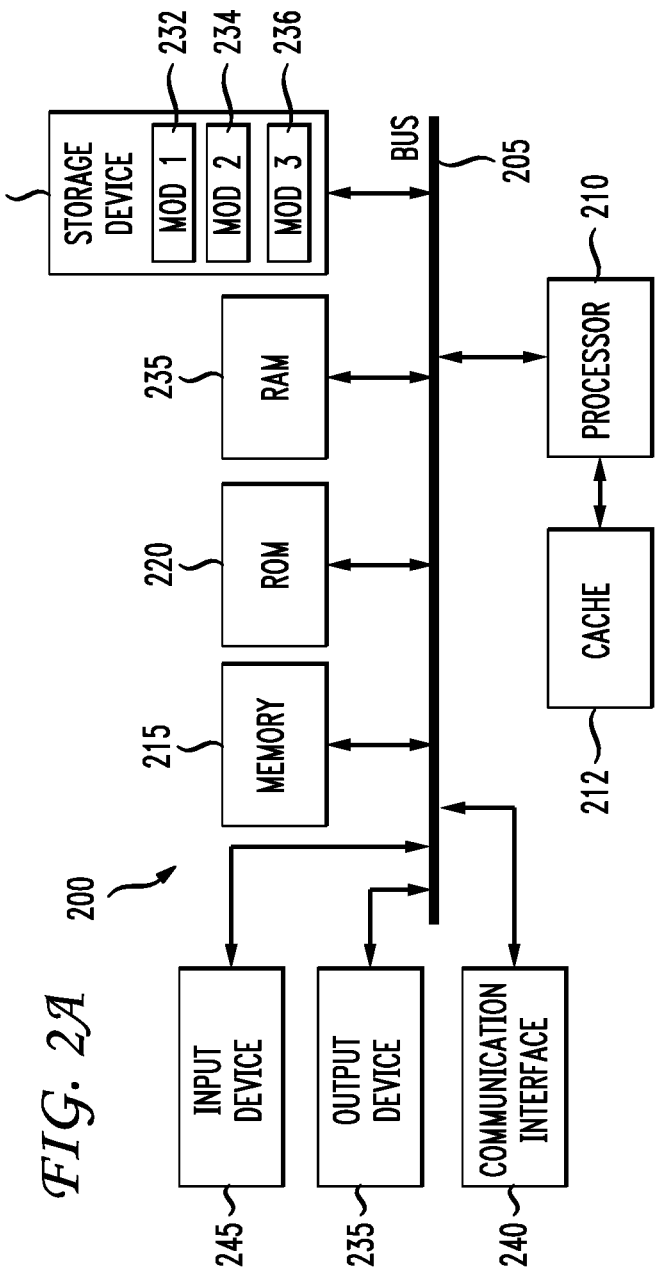

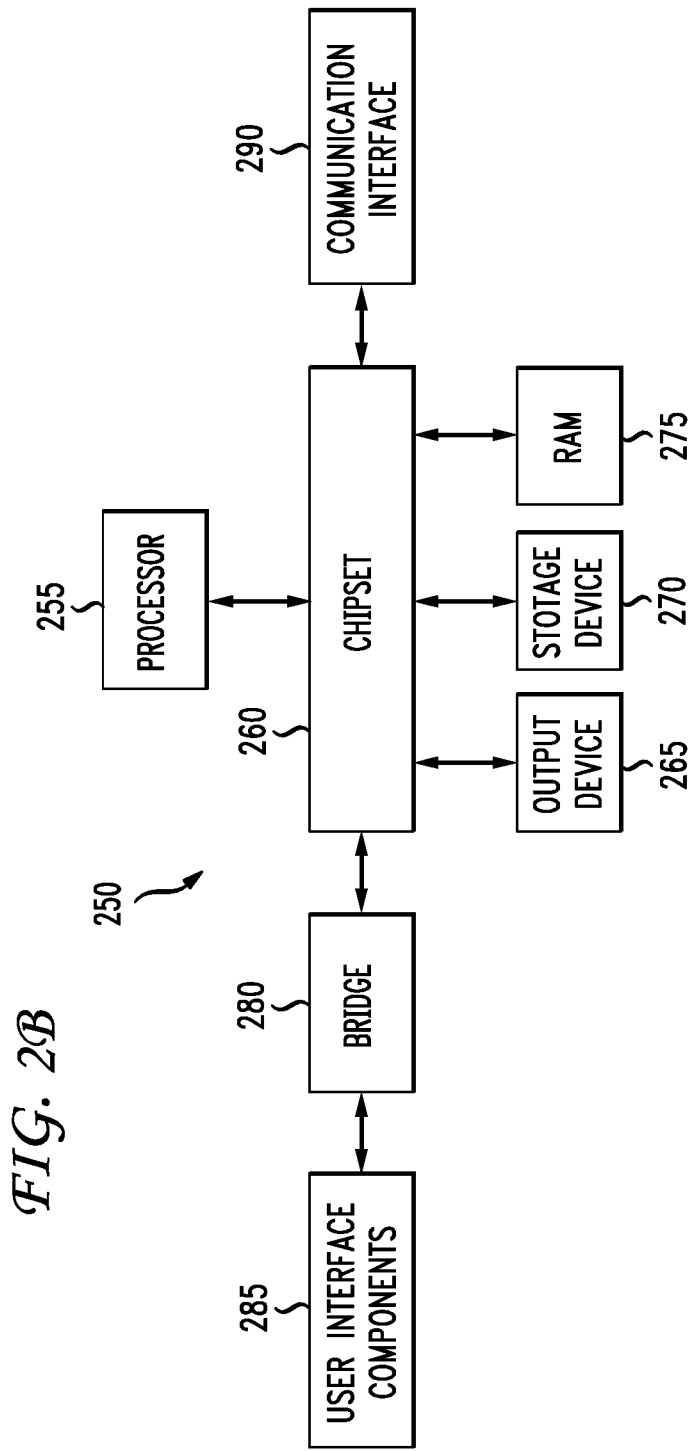

ADAPTIVE LOAD BALANCING FOR APPLICATION CHAINS

TECHNICAL FIELD

This disclosure relates in general to the field of computer networks and, more particularly, pertains to adaptive load balancing for application chains.

BACKGROUND

Application Delivery Controllers, Server Load-balancers, or Proxies are commonly deployed in Data centers for scalability and redundancy purposes. Typically applications are deployed in multi-tiered environments (e.g., Web, App, DB, etc.) and load-balancers are used in one or more of these tiers. The load-balancer will serve each incoming connection to one of the available servers in the load-balancer's tier. While most load-balancers in the market today can do some form of Health checks (e.g., ICMP probes, HTTP checks, etc.) and some form of load algorithms (e.g., round-robin, least conn, least load, etc.) to determine which of the servers are still alive and which server to send the connection to, these checks are limited to the load-balancer's respective tier.

Many application flows traverse multiple tiers, and there could be multiple servers that can be load balanced to in each of the tiers. Thus the flow can potentially be traversing one of many paths. As a result, a load-balancer can make individual decisions in each tier that cumulatively lead to total or partial application failures, or may not be the best path for the end-to-end flow. Accordingly, improvements are needed.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which:

FIGS. 2A and 2B illustrate an example system embodiments according to some aspects of the subject technology;

DESCRIPTION OF EXAMPLE EMBODIMENTS

Figure 1:
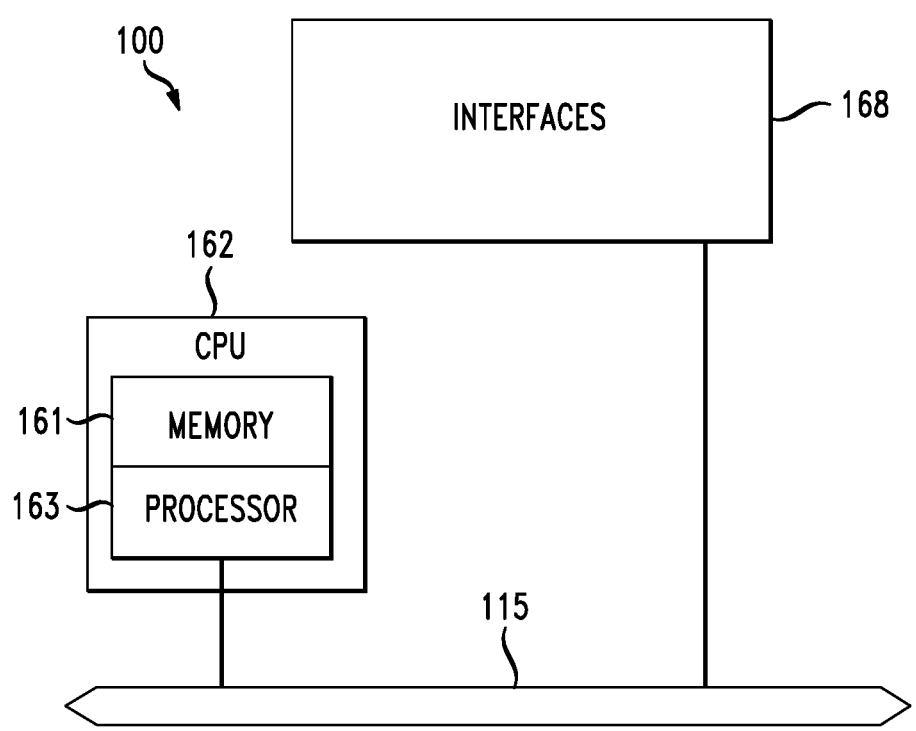
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Disclosed are systems, methods, and computer-readable storage media for adaptive load balancing for application chains. A load-balancer can receive data packet/s for a client connection or transaction to be routed through an application chain. The load-balancer can select, based on an application path table, the best end-to-end application path through the application chain. The decision can take into account multiple tiers and the routing, forwarding or load balancing decision can result in an application path that spans multiple tiers and thus provides an improvement over the previous approach of making such decisions only within a single tier. The application path table can identify two or more end-to-end application paths through the application chain along with a corresponding performance status for each end-to-end application path through the application chain. The performance status for each end-to-end application path can indicate a performance level of the end-to-end application path determined based on performance of previous data packets for client connections/transactions transmitted through the application chain according to that end-to-end application path. The load-balancer can then route data packets for new client connections through the application chain according to the best end-to-end application path.

The selection by the load-balancer of which route or path to use for the data packet through the application chain can also be based on other factors as well. For example, the load-balancer may analyze specific segments of the various application paths to identify performance on a segment basis. A particular application associated with the data packet may have a requirement of performance that can be specific to data or specific to processor speed or bandwidth. Thus, while in overall performance of an end-to-end application path may be superior in an overall respect, a particular segment which can relate to a function such as data processing, may be inferior. In such a case, the load-balancer may select a particular end-to-end application path that has a more superior segment in a particular area or category. User preferences, service level agreements, detected dynamic data, data associated with an application causing the data packet that needs to be routed can all provide instructions to a load-balancer when selecting which application chain to route the data packets through.

The load-balancer can perform this functionality on a dynamic basis or based on static policies. For example, the data packet can be received at the load-balancer from a particular source that has a service level agreement or profile which guides the load-balancer to route the data packet through the application chain according to the first end-to-end application path based on the stored policy. In another aspect, the load-balancer can receive a data packet or groups of data packets dynamically and make decisions with respect to routing based on current factors. For example, header information in a data packet may indicate preferences on how to route that packet. Workloads may have particular needs at particular times which can indicate how and when to route the data packet. In one example, a workload may have a data staging phase followed by a compute phase in which processing power is required. Finally, the workload can require bandwidth to transmit a large amount of data from one location to another. Data packets associated with the workload can have indications of what phase the workload is in. The load-balancer can route data packets for the workload at different times and in different segments through different application paths and across multiple tiers.

In another aspect, the method can include obtaining data regarding components serving routed data packets through an application chain for a first client connection and storing the data in an application path table for use in routing decisions for a second client connection along the application chain, wherein the application chain covers multiple tiers. Obtaining the data can be achieved by looking deeper into one or more packets belonging to a connection/transaction to identify flow information, connection information, transaction information, application programming interface (API) level performance and/or status information. For example, the system can look at application/API response times, response codes, error codes, messages, or any other data or parameter to directly identify or infer by the load-balancer or any other entity the ongoing connections, a status of ongoing connections, response times, error codes, and so forth. The routing decision can encompass routing, forwarding or load balancing decisions.

Example Embodiments

Disclosed are systems and methods for adaptive load balancing for application chains. A brief introductory description of exemplary systems and networks, as illustrated in FIGS. 1 through 4, is disclosed herein, followed by a discussion of adaptive load balancing for application chains. The disclosure now turns to FIG. 1.

A computer network is a geographically distributed collection of nodes interconnected by communication links and segments for transporting data between end points, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Network virtualization allows hardware and software resources to be combined in a virtual network. For example, network virtualization can allow multiple numbers of VMs and microservice containers to be attached to the physical network via respective virtual LANs (VLANs). The VMs and microservice containers can be grouped according to their respective VLAN or VXLAN, and can communicate with other VMs and microservice containers as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, end point groups (EPGs) can be used in a network for mapping applications to the network. In particular, EPGs can use a grouping of similar application end points (e.g., microservice containers) in a network to apply connectivity and policy to the group. EPGs can act as a container for buckets or collections of microservice containers, applications, or application components, and tiers for implementing forwarding and policy logic. EPGs also allow separation of network policy, security, and forwarding from addressing and network segmentation (vlans or vxlans) by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), microservice containers, etc. For instance, resources may include service devices (firewalls, deep packet inspectors, traffic monitors, load-balancers, etc.), compute/processing devices (servers, CPU's, memory, brute force processing capability), storage devices (e.g., network attached storages, storage area network devices), etc. In addition, such resources may be used to support virtual networks, virtual machines (VM), microservice containers, databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of network device 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform control plane functions, such as routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the network device.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, output device 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or RAM 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
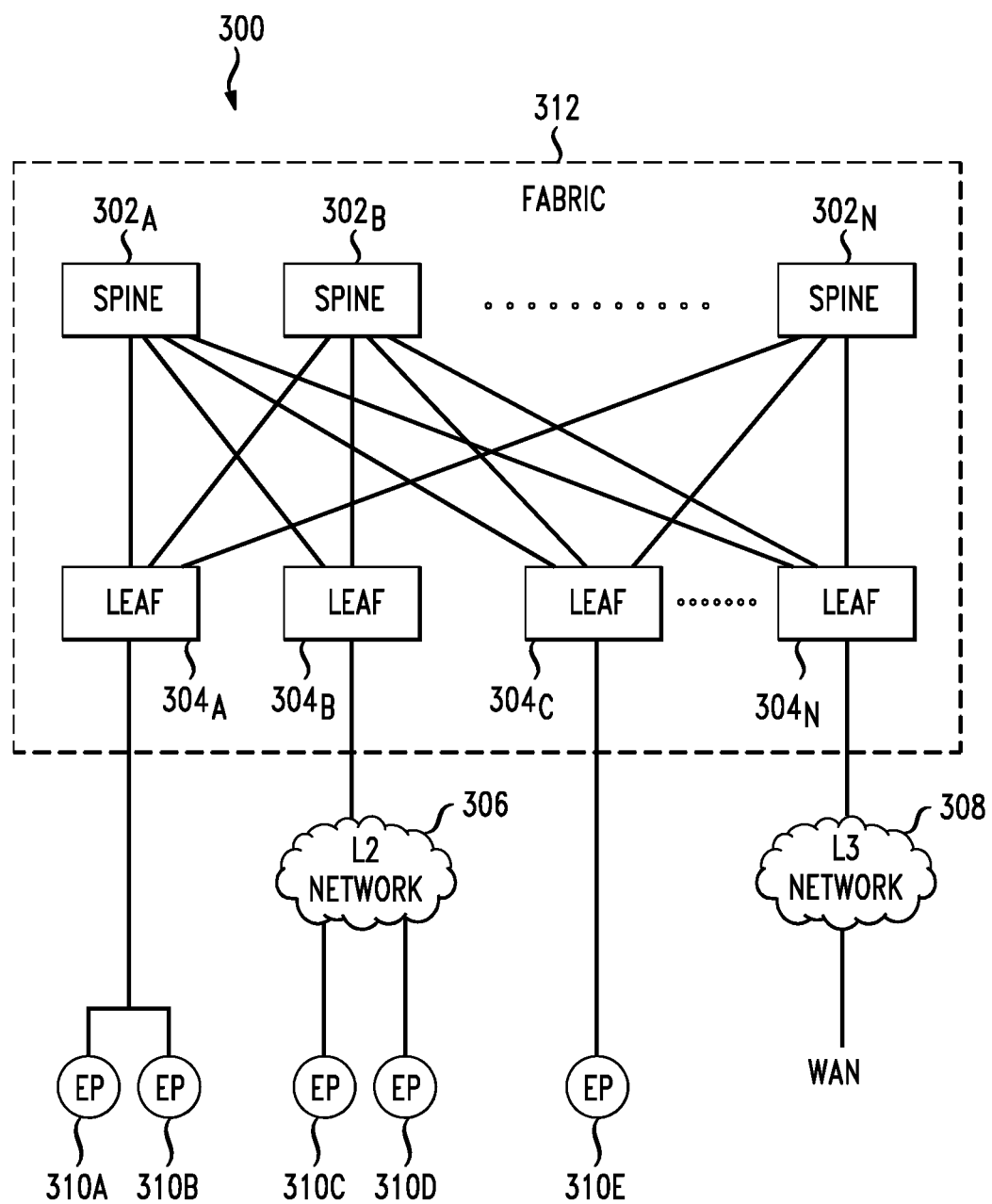
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, . . . , $302_N$ (collectively "302") connected to leaf switches $304_A$, $304_B$, $304_C$ . . . $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

Network connectivity in the fabric 312 can flow through the leaf switches 304. Here, the leaf switches 304 can provide servers, resources, end points, external networks, microservice containers or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

End points 310A-E (collectively "310") can connect to the fabric 312 via leaf switches 304. For example, end points 310A and 310B can connect directly to leaf switch 304A, which can connect end points 310A and 310B to the fabric 312 and/or any other one of the leaf switches 304. Similarly, end point 310E can connect directly to leaf switch 304C, which can connect end point 310E to the fabric 312 and/or any other of the leaf switches 304. On the other hand, end points 310C and 310D can connect to leaf switch 304B via L2 network 306. Similarly, the wide area network (WAN) can connect to the leaf switches 304C or 304D via L3 network 308.

End points 310 can include any communication device, such as a computer, a server, a switch, a router, etc. In some cases, the end points 310 can include a server, hypervisor, or switch configured with a VTEP functionality which connects an overlay network, with the fabric 312. The overlay network can host physical devices, such as servers, applications, EPGs, virtual segments, virtual workloads, etc. In addition, the end points 310 can host virtual workload(s), clusters, and applications or services, which can connect with the fabric 312 or any other device or network, including an external network. For example, one or more end points 310 can host, or connect to, a cluster of load-balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Having disclosed a brief introductory description of exemplary systems and networks, the discussion now turns to adaptive load balancing for application chains. Application Delivery Controllers, Server Load-balancers, or Proxies are commonly deployed in Data centers for scalability and redundancy purposes. Typically applications are deployed in multi-tiered environments (e.g., Web, App, DB, etc.) and load-balancers are used in one or more of these tiers. The load-balancer will serve each incoming connection to one of the available servers in the load-balancer's tier. While most load-balancers in the market today can perform some form of health check (e.g., ICMP probes, HTTP checks, etc.) and/or some form of load algorithm (e.g., round-robin, least conn, least load, etc.) to determine whether servers are still alive and which server to send the connection to, these checks are limited or localized to the load-balancer's respective tier.

Load-balancers can service one tier or multiple tiers. However, as a general issue, all of the load-balancers typically will look at only part of a flow that they are load balancing across multiple tiers. Assume three tiers go through a load-balancer. When a connection comes in for a tier, the load-balancer will typical only look at the servers within a particular tier, the load-balancer will only look at that portion of the application path related to one tier and will not get performance data and/or other data for other tiers when making a routing decision. The load-balancer may also only look at a portion of the entire application chain on some other basis besides a tier division. The load-balancer may be pinging a particular server to insure it is operational, but that also is only one piece of information to understand when making routing decisions.

Many application chains, however, include multiple tiers, each including multiple servers that can be load-balanced to. Thus, a data flow can traverse an application according to one of multiple potential end-to-end application paths. When load-balancers in a multi-tiered application chain make decisions based on data pertaining to a single tier, these decisions can cumulatively lead to total or partial application failures, or result in selection of an end-to-end application path that is not the optimal end-to-end application path to traverse the application chain.

To alleviate this issue, a load-balancer can be configured to select an end-to-end data path through an application chain, rather than a single server in a single tier of the application chain, to route a data packet. The load-balancer will take an overall end-to-end application chain view when making routing decisions. This more holistic view will provide better data and better routing decisions to ultimately get the client the data and performance they need. Further, by taking an end-to-end application chain approach, the system can also identify whether the end service is operational or functioning to enable the client to achieve the processing and result they desire. The load-balancer can select an end-to-end data path based on the performance of each potential end-to-end application path through the application chain. For example, a load-balancer can monitor performance of each potential end-to-end application path through an application chain and record data describing performance of each end-to-end application path in an application path table. The load-balancer can then utilize the application path table to select end-to-end data path for routing incoming data packets/connections through the application chain. The application chain can span one or more tiers. For example, taking an overall application chain view can apply to components within a single tier as well. The concepts disclosed herein can apply to any number of different tier configurations.

Figure 4A:
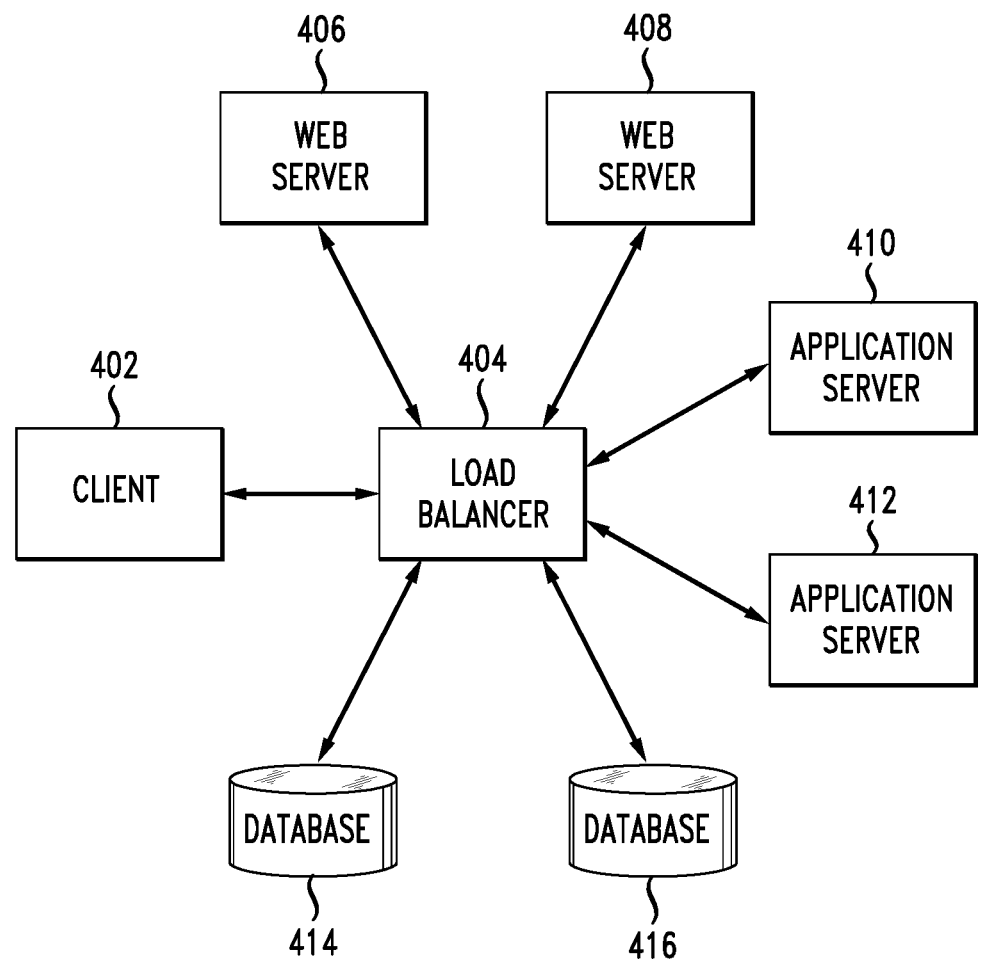
FIGS. 4A-4C illustrate examples of adaptive load balancing for application chains.
Figure 4B:
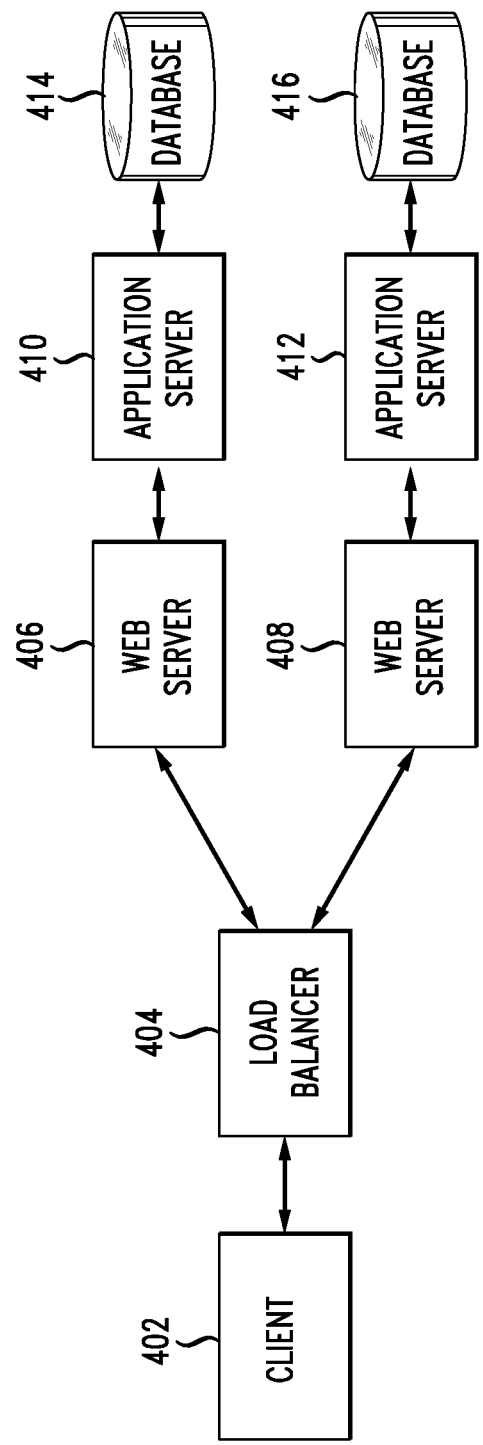
Figure 4C:
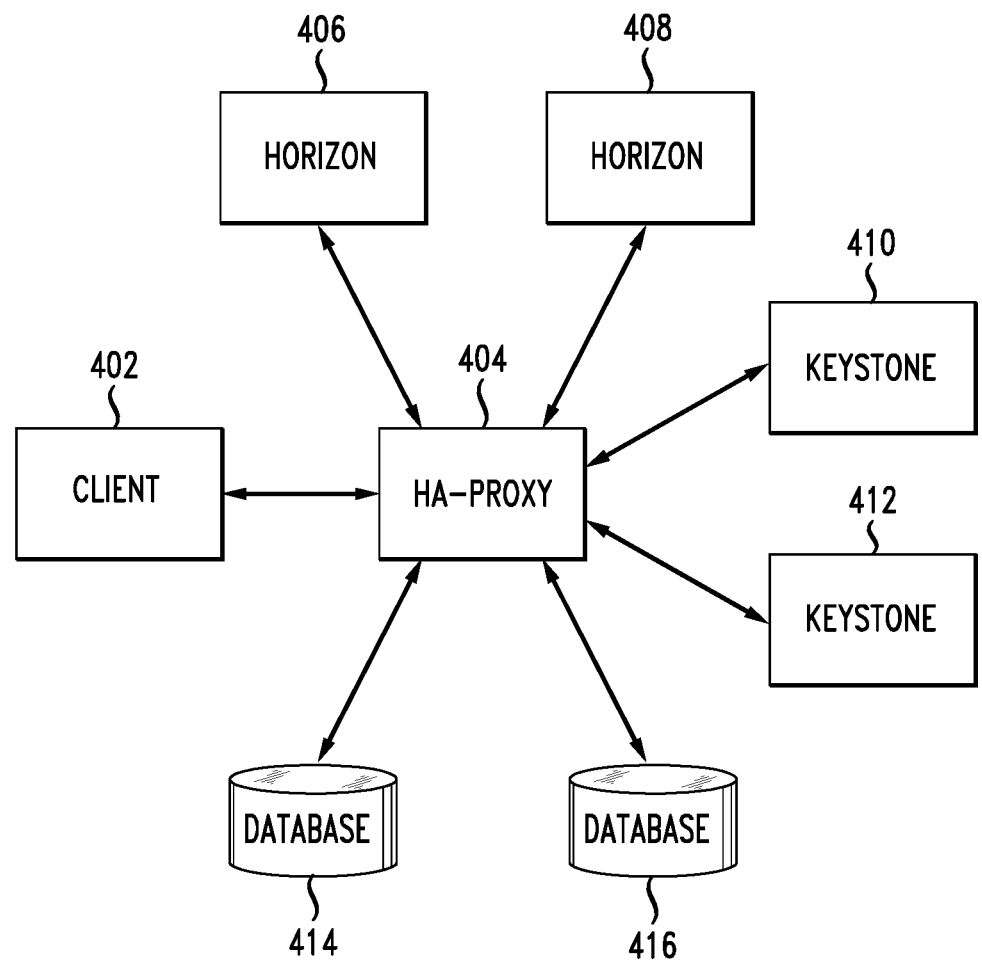

FIGS. 4A-4C illustrate examples of adaptive load-balancing for application chains. FIG. 4A shows an example of a three tier application chain that flows from a first tier (i.e., web server), to a second tier (i.e., application server), and finally to a third tier (i.e., database). As shown, each tier includes two possible servers/databases that can be selected. For example, the first tier includes webservers 406 and 408, the second tier includes application servers 410 and 412, and the third tier includes databases 414 and 416.

Load-balancer 404 can be configured to route data packets for a connection/transaction/flow received from client 402 through each tier of the application chain. For example, load-balancer 404 can first route a data packet to one of web servers 406 and 408, then route the data packet through one of application servers 410 and 412, and finally route the data packet through one of databases 414 and 416. Accordingly, load-balancer 404 can route a data packet through the application chain according to one of eight possible end-to-end application paths. Note that the previous approach required the load-balancer to make each routing decision independent of the overall context of the application chain. The connection tables that have been stored in load-balancers are limited to data within individual tiers.

In contrast to traditional multi-tier application chains where a load-balancer makes a decision at each individual tier regarding which server/database to route a data packet, load-balancer 404 can be configured to select an entire end-to-end application path for a data packet/connection/flow through the application chain. To accomplish this, load-balancer 404 can maintain an application path table that includes a performance status of each potential end-to-end application path and selects an end-to-end application path based on the performance status for each end-to-end application path. The performance status for each end-to-end application path can indicate a performance level of the respective end-to-end application path. Load-balancer 404 can select the end-to-end application path that, based on the performance statuses, is performing at the highest level. Alternatively, load-balancer 404 can select an end-to-end application path that is performing at or above a threshold performance level. The table maintains data on an application chain basis. The table further records results of routed data packets/connections. It could be across any number of tiers or within a single tier. The system can also observe the data packets (inspect the packet headers and contents) to obtain or infer response codes, error codes, or other data for performance and/or failure information. For example, first data packets can be routed to a first Web server and the response codes may indicate a proper response, but the time required to communicate the data packets to the first Web server could indicate a network delay. Based on that data, the load-balancer may route additional data packets to a different Web server.

The system can be application aware without knowing anything specific about the application. This is achieved by monitoring the response codes, error codes, or other performance data to make additional routing decisions. This data may be obtained by looking deeper into a packet to either directly identify flow information, connection information, transaction information, API level performance and/or status information, which can include application or API response times, response codes, error codes, or messages. For example, the system can look at the higher layers, like HTTP or other higher level protocols such as FTP for other applications. In other words, the system can analyze the overall transaction or flow/connection and not just at one packet to arrive at the information. For most applications, such information can be derived from the API responses, which are in the HTTP connection information, transmitted in one (or more) packets, typically towards the end of the connection. Therefore, by looking deeper into the packets, not just at the IP or TCP layer, but also higher layers like HTTP/FTP/DB etc., the system can analyze most or all of the packets passing through, to identify a transaction state message (such as, for example, a "complete" for HTTP 200 OK) or error code (for example, for HTTP, 500 internal server error, 503 service not available). By looking deeper into some or all of the packets, the system can also time how long the transaction took to complete (say from start time to the time the system sees an HTTP 200 response), not just the time to transmit each packet. The combination of status, errors, response times, and so forth provides a bigger picture view of the overall application performance across multiple tiers.

The basic difference in previous approaches is that other systems require knowledge of a particular application. This case and the concepts disclosed herein do not require any knowledge of the applications in order to make proper routing decisions. The performance status for each end-to-end application path can be based on historical flow data for the respective end-to-end application path. Load-balancer 404 can monitor performance of data transmitted through the application chain according to each end-to-end application path and record data describing performance of each end-to-end application path in the application path table. This can include data such as failure statuses, error code responses, response time, latency metrics, etc. Load-balancer 404 can continuously gather flow data and update the application path data.

In some embodiments, load-balancer 404 can use the historical flow data to rank the potential end-to-end application paths based on their determined performance level. Load-balancer 404 can then select an end-to-end application path based on the ranking.

In some embodiments, load-balancer 404 can mark an end-to-end application path as unusable for a specified period. For example, in response to determining that the performance level of an end-to-end application path has degraded below a threshold level, load-balancer 404 can update the performance status of the end-to-end application path to indicate that particular end-to-end application path should not be used. This can be indefinite or, alternatively, for a predetermined period of time, after which load-balancer 404 will again use the end-to-end application path.

FIG. 4B shows another embodiment of a three tier application chain. In contrast to the embodiment shown in FIG. 4A where all three tiers of the application chain went through load-balancer 404, in the example shown in FIG. 4B, only the first tier of the application chain goes through load-balancer 404. Load-balancer 404 can still select an end-to-end application chain to route data packets/connections based on performance of the potential end-to-end application chains, however in this example load-balancer 404 only has two potential end-to-end application chains to choose from (i.e., web server 406 or web server 408).

Load-balancer 404 can gather flow data describing performance of each end-to-end application path, such as failure statuses, error code responses, response times, latency metrics, etc., and update the application path table accordingly. Load-balancer 404 can use the application path table to select an end-to-end application path through the application chain.

FIG. 4C shows another embodiment of a three tier application chain. The example shown in FIG. 4C is a specific example of the system shown in FIG. 4A. FIG. 4C shows a common scenario in OpenStack, where an application chain flows from Horizon service to a Keystone service and finally to a database. In this example, all three tiers of the application chain go through High Availability Proxy (HAProxy) 404, which is configured to manage load balancing for each tier of the application chain. Similar to the other described example, high availability proxy 404 can gather flow data describing performance of each end-to-end application path, such as failure statuses, error code responses, response times, latency metrics, etc., and update the application path table accordingly. High availability proxy 404 can use the application path table to select an end-to-end application path through the application chain.

Figure 5:
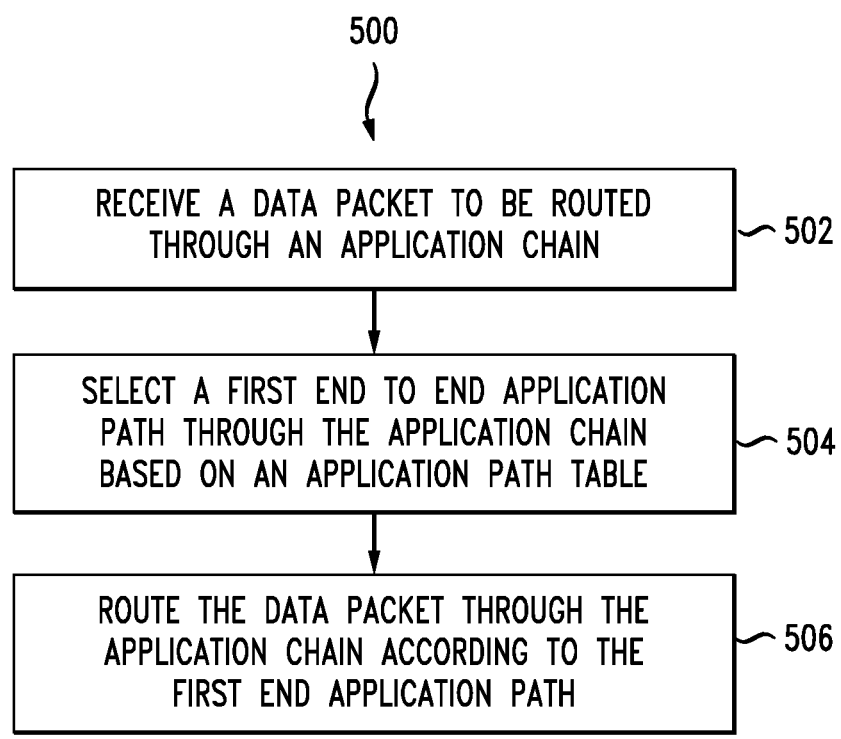
FIG. 5 illustrates a method of adaptive load balancing for application chains.

FIG. 5 illustrates an example method 500 of adaptive load balancing for application chains. It should be understood that there can be additional, fewer, or alternative steps performed in similar or alternative orders, or in parallel, within the scope of the various embodiments unless otherwise stated.

At step 502, a load-balancer can receive a data packet/connection to be routed through an application chain. The application chain can include at least a first tier and a second tier. The second tier is not required but is optional.

At step 504, the load-balancer can select a first end-to-end application path through the application chain based on an application path table. The application path table can identify two or more end-to-end application paths through the application chain along with a corresponding performance status for each end-to-end application path through the application chain.

The performance status for each end-to-end application path can indicate a performance level of the end-to-end application path determined based on performance of previous data packets (for previous connections/transactions) transmitted through the application chain according to the end-to-end application path. For example, after transmitting a first data packet or connection through the application chain according to the first end-to-end application path, the load-balancer can update the performance status of the first end-to-end application path based on a performance of the first data packet/connection while traversing the application chain according to the first end-to-end application path. Likewise, after transmitting a data packet/connection through the application chain according to a second end-to-end application path, the load-balancer can update the performance status of the second end-to-end application path based on a performance of the data packets/connection while traversing the application chain according to the second end-to-end application path.

The load-balancer can determine the performance of the first end-to-end application path based on various factors, such as a total transmission time for the first data packet/connection to traverse the application chain, whether the first data packet/connection successfully traversed the application chain, etc.

To select the first end-to-end application path, the load-balancer can determine, based on the performance status corresponding to the first end-to-end application path, that the first end-to-end application path is performing at a higher level than at least a second end-to-end application path through the application chain.

At step 506, the load-balancer can route the data packet/connection through the application chain according to the first end-to-end application path.

The selection by the load-balancer of which route to use for the data packet through the application chain can also be based on other factors as well. Specific segments within an end-to-end path of the various application chains can be analyzed to identify performance on a segment basis. A particular application associated with the data packet may have a requirement of performance that can be specific to data or specific to processor speed or bandwidth. While in overall performance of an end-to-end application path may be superior in an overall respect, a particular segment related to any function, such as data processing, may be inferior, average or superior with respect to performance (or any other parameter). In such a case, the load-balancer may select a particular end-to-end application path that has a more superior segment in a particular area or category. User preferences, service level agreements, detected dynamic data, data associated with an application causing the data packet that needs to be routed can all provide instructions to a load-balancer when selecting which application chain to route the data packets through.

The load-balancer can perform this functionality on a dynamic basis or based on static policies. For example, the data packet may be received at the load-balancer from a particular source that has a service level agreement or profile which causes the load-balancer to route the data packet through the application chain according to an end-to-end application path based on the stored policy. In another aspect, the load-balancer can receive a data packet or groups of data packets dynamically and make decisions with respect to routing based on current factors. For example, header information in a data packet can indicate preferences on how to route that packet. Workloads can have particular needs at particular times which can indicate how and when to route the data packet. In one example, a workload can have a data staging phase which requires access to a database followed by a compute phase in which processing power is required. Finally, the workload can require bandwidth to transmit a large amount of data from one location to another. Data packets associated with the workload can have indications of what phase the workload is in. The load-balancer can route data packets for the workload at different times and in different segments through different application paths.

Other outside factors can also be coordinated with routing decisions, such as one or more of a cost of resources, time of day, location of resources, a physical characteristic of the resources, a suggested path or desired characteristics within the data packet or from the source of the data packet, and so forth. For example, a particular data center at night may have cheaper processing costs and the load-balancer may utilize that information to route data packets to that data center based on that parameter and potentially other parameters as well.

For example, assume that application is providing data packets to location of first tier having a first server. But that tier keeps failing, based on that experience, the load-balancer shifts to tier 2 having a second server. When a second application starts and data packets are to be routed, forwarded or load-balanced, by learning from the history of the first application, the router will route data packets to the second tier. In one example, assume there is a web request which needs to be routed to a certain first server. The data packets associated with the web request are received and routed to the first server. Assume server one adequately processes the request but there were some issues perhaps with performance or availability or latency or some other parameter. When the next transaction comes along, another request from another application, the load-balancer needs to make a decision which can span multiple tiers. With the historical record of what happened with the first request, the system can determine that, based on the previous history, the first server in the first tier did not properly service the first request. The load-balancer will send the second request to a different server perhaps in a different tier. The system will also build information not only about a single server but across the entire application chain which in some cases can span multiple tiers.

Figure 6:
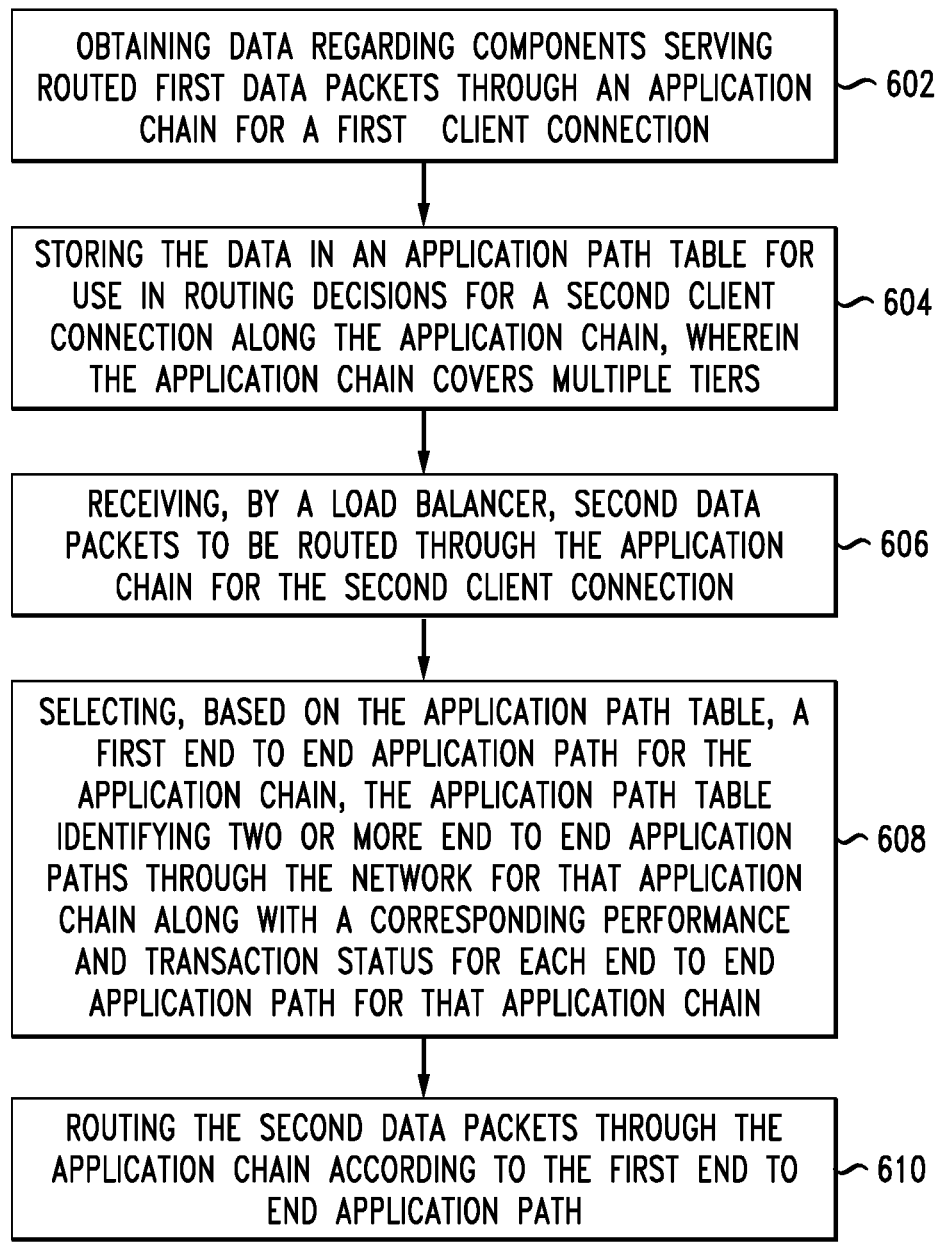
FIG. 6 illustrates another method embodiment.

FIG. 6 illustrates another method aspect of this disclosure. As shown in FIG. 6, a method includes obtaining, by a load-balancer, data regarding components serving routed first data packets through an application chain for a first client connection (602) and storing the data in an application path table for use in routing decisions for a second client connection along the application chain, wherein the application chain covers multiple tiers (604). Obtaining the data can be achieved by looking deeper into a packet to find out one or more of flow information, connection information, transaction information, API level performance and status information, for example by looking at application/API response times, response codes, error codes, messages, and so forth. Obtaining the data can include one of receiving the data and inferring the data by a load-balancer based on one or more of ongoing connections associated with the application chain, a status of the ongoing connections, and response times associated with the application chain. In one aspect, the data includes at least one of performance data, a transaction status, a response code, and an error code. The components referenced above can include one or more of network components, hardware components, and applications. The routing decisions can be made independent of whether a load-balancer can see each of the multiple tiers covered by the application chain.

The routing decisions can include one or more of routing, forwarding, and load balancing. The method further can include receiving, by a load-balancer, second data packets (for second client connection) to be routed through the application chain for the second client connection (606) and selecting, based on the application path table, a first end-to-end application path for the application chain, the application path table identifying two or more end-to-end application paths through the network for that application chain along with a corresponding performance and transaction status for each end-to-end application path for that application chain (608). The first data packets referred to above can mean a first set of data packets. Similarly, the second data packets can refer to a second set of data packets for the second client connection.

In another aspect, the corresponding performance and transaction status for each end-to-end application path in the application path table indicates a performance level of the end-to-end application path determined based on performance of the first data packets transmitted through the application chain for the first client connection. The performance level of the end-to-end application path can be further determined based on a status of at least one connection that is prior to the first data packets being transmitted through the application chain for the first client connection.

The method can further include routing the second data packets (or a second client connection) through the application chain according to the first end-to-end application path (610). The second data packets can be a set of data packets associated with the second client connection. The routing of the second data packets can include at least one of routing, forwarding and load-balancing. The step of selecting the first end-to-end application path can further include determining, based on the corresponding performance status corresponding to the first end-to-end application path, that the first end-to-end application path is performing at a higher level than at least a second end-to-end application path through the application chain. After transmitting the first data packets (first client connection) through the application chain according to the first end-to-end application path, the method can further include updating the corresponding performance status of the first end-to-end application path based on a performance of the first data packets (data packets associated with first client connection) while traversing the application chain according to the first end-to-end application path.

It is noted that the performance of the first data packets (first client connection) can include at least one of a transaction completion status, a total transmission time for the data packets to traverse the application chain, whether the data packets successfully traversed the application chain, an error codes, a response time, a latency value and ongoing connection status, After transmitting the first data packets (first client connection) through the application chain according to a second end-to-end application path, the method can include updating the corresponding performance status of the second end-to-end application path based on a performance of the first data packets (data packets associated with the first client connection) (or other parameters) while traversing the application chain according to the second end-to-end application path.

Another feature of the present disclosure relates to the application path table. The application path table can be created dynamically after obtaining the data or at any time in the process, or it could be statically configured on the load-balancer. In another aspect, the application path table that is used could be an enhancement of an existing load-balancing connection table and/or algorithm. Thus, the application path table could be statically configured and applied or could exist and have a modification made to the table and/or to an algorithm associated with table for future routing decisions.

In another aspect, the method can include transmitting a probe into an application path along the application chain when the application chain is determined to be one of degraded and failed. The information obtained from the probe can be further utilized to create yet a new application path table, or enhance or modify an existing application path table or algorithm. If the probe or new client connection is successful through the application path, the method can include updating the application path from degraded/failed to active/in-service in the application path table. The routing or load-balancing decisions can be made independent of whether a load-balancer can see each of the multiple tiers covered by the application chain. Further, the load-balancing decisions in each tier do not need to be made locally within that tier. Rather, the decisions can be made globally across tiers from an end-end path perspective through the application chain.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    obtaining, by a load-balancer, data regarding components serving routed first data packets through an application chain for a first client connection; and
    storing the data in an application path table for use in routing decisions for a second client connection along the application chain, wherein the application chain covers multiple tiers, and wherein the data is associated with a performance value for one or more of a flow, a connection, a transaction, and an application programming interface;
    receiving, by the load-balancer, second data packets to be routed through the application chain for the second client connection;
    selecting, based on the application path table, a first end-to-end application path through the application chain, the application path table identifying multiple end-to-end application paths through a network for that application chain along with a corresponding performance and transaction status for each end-to-end application path for that application chain, each of the multiple end-to-end application paths for that application chain being a different combination of the multiple tiers of that application chain; and
    routing the second data packets through the application chain according to the selected first end-to-end application path;
    wherein the corresponding performance and transaction status for each end-to-end application path in the application path table indicates a performance level of the end-to-end application path determined based on performance of the first data packets transmitted through the application chain for the first client connection;
    wherein each tier with in the application chain contains network elements with common functionality, and each tier is different from each other
    wherein there are one or more application servers that are available to be load-balanced to in each tier.

2. The method of claim 1, wherein obtaining the data comprises one of receiving the data and inferring the data at the load-balancer based on one or more of ongoing connections associated with the application chain, a status of the ongoing connections, and response times associated with the application chain.

3. The method of claim 1, wherein the data comprises at least one of performance data, a transaction status, a response code, and an error code.

4. The method of claim 1, wherein the components comprise one or more of network components, hardware components, and applications.

5. The method of claim 1, wherein the routing decisions comprise one or more of routing, forwarding, and load-balancing.

6. The method of claim 1, wherein the performance value of the end-to-end application path is further determined based on a status of at least one connection that is prior to the first data packets being transmitted through the application chain for the first client connection.

7. The method of claim 1, wherein the routing of the second data packets comprises one of routing, forwarding and load-balancing.

8. The method of claim 1, wherein selecting the first end-to-end application path comprises:
    determining, based on the corresponding performance status corresponding to the first end-to-end application path, that the first end-to-end application path is performing at a higher level than at least a second end-to-end application path through the application chain.

9. The method of claim 1, further comprising:
    after transmitting the second data packets for the second client connection through the application chain according to the first end-to-end application path, updating the corresponding performance status of the first end-to-end application path based on a performance of the second data packets while traversing the application chain according to the first end-to-end application path.

10. The method of claim 9, wherein the performance of the second data packets comprises at least one of a transaction completion status, transmission time for one or more packets of that connection/transaction to traverse the application chain, whether the data packets successfully traversed the application chain, error codes, response times, latency and ongoing connection status.

11. The method of claim 1, further comprising:
    after transmitting the second packets for the second connection through the application chain according to a second end-to-end application path, updating the corresponding performance and transaction status of the second end-to-end application path based on a performance of the data packets of that connection/transaction while traversing the application chain according to the second end-to-end application path.

12. The method of claim 1, wherein the application path table is either created after obtaining the data or an enhancement of an existing load-balancing connection table and/or algorithm.

13. The method of claim 1, wherein the application path table is either dynamically created or statically configured.

14. The method of claim 1, further comprising:
    periodically transmitting a probe or a new client connection through an application path along the application chain when the application path is determined to be one of degraded or failed.

15. A system, comprising:
    a processor;
    a memory containing instructions which when executed by the processor cause the processor to perform operations comprising:
        obtaining, by a load-balancer, data regarding components serving routed first data packets through an application chain for a first client connection; and
        storing the data in an application path table for use in routing decisions for a second client connection along the application chain, wherein the application chain covers multiple tiers, and wherein the data is associated with a performance value for one or more of a flow, a connection, a transaction, and an application programming interface;
        receiving, by the load-balancer, second data packets to be routed through the application chain for the second client connection;
        selecting, based on the application path table, a first end-to-end application path through the application chain, the application path table identifying multiple end-to-end application paths through a network for that application chain along with a corresponding performance and transaction status for each end-to-end application path for that application chain, each of the multiple end-to-end application paths for that application chain being a different combination of the multiple tiers of that application chain; and routing the second data packets through the application chain according to the selected first end-to-end application path;

wherein the corresponding performance and transaction status for each end-to-end application path in the application path table indicates a performance level of the end-to-end application path determined based on performance of the first data packets transmitted through the application chain for the first client connection;

wherein each tier with in the application chain contains network elements with common functionality, and each tier is different from each other wherein there are one or more application servers that are available to be load-balanced to in each tier.

16. The system of claim 15, wherein selecting the first end-to-end application path comprises:

determining, based on the corresponding performance status corresponding to the first end-to-end application path, that the first end-to-end application path is performing at a higher level than at least a second end-to-end application path through the application chain.

17. The system of claim 15, further comprising:

after transmitting the second data packets for the second client connection through the application chain according to the first end-to-end application path, updating the corresponding performance status of the first end-to-end application path based on a performance of the second data packets while traversing the application chain according to the first end-to-end application path.

18. A not-transitory computer readable media containing instructions which when executed by the processor cause the processor to perform operations comprising:

obtaining, by a load-balancer, data regarding components serving routed first data packets through an application chain for a first client connection; and storing the data in an application path table for use in routing decisions for a second client connection along the application chain, wherein the application chain covers multiple tiers, and wherein the data is associated with a performance value for one or more of a flow, a connection, a transaction, and an application programming interface;

receiving, by the load-balancer, second data packets to be routed through the application chain for the second client connection;

selecting, based on the application path table, a first end-to-end application path through the application chain, the application path table identifying multiple end-to-end application paths through a network for that application chain along with a corresponding performance and transaction status for each end-to-end application path for that application chain, each of the multiple end-to-end application paths for that application chain being a different combination of the multiple tiers of that application chain; and routing the second data packets through the application chain according to the selected first end-to-end application path;

wherein the corresponding performance and transaction status for each end-to-end application path in the application path table indicates a performance level of the end-to-end application path determined based on performance of the first data packets transmitted through the application chain for the first client connection;

wherein each tier with in the application chain contains network elements with common functionality, and each tier is different from each other wherein there are one or more application servers that are available to be load-balanced to in each tier.

19. The media of claim 18, wherein selecting the first end-to-end application path comprises:

determining, based on the corresponding performance status corresponding to the first end-to-end application path, that the first end-to-end application path is performing at a higher level than at least a second end-to-end application path through the application chain.

* * * * *